US007252124B1

(12) United States Patent
Chuang

(10) Patent No.: US 7,252,124 B1
(45) Date of Patent: Aug. 7, 2007

(54) WORK FEEDING AND CONVEYING DEVICE FOR A PLANING MACHINE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 0 days.

(21) Appl. No.: 11/378,367

(22) Filed: Mar. 20, 2006

(51) Int. Cl.
*B27C 1/04* (2006.01)
*B23C 9/00* (2006.01)

(52) U.S. Cl. .................. 144/117.1; 144/128; 409/159; 409/161

(58) Field of Classification Search ............. 144/114.1, 144/117.1, 129, 130, 128, 245.1, 245.2; 408/206, 408/208, 218; 409/145, 157, 159, 161, 182
See application file for complete search history.

(56) References Cited

U.S. PATENT DOCUMENTS 3,913,642 A * 10/1975 Porter ..................... 144/114.1
4,997,017 A * 3/1991 Dobbie ....................... 144/128
5,641,053 A * 6/1997 Nannini et al. .......... 198/461.3
5,882,157 A * 3/1999 Buysman et al. ........... 409/139
5,979,520 A * 11/1999 Behrendt ................. 144/114.1
5,988,239 A * 11/1999 Chen .......................... 144/129

* cited by examiner

*Primary Examiner*—Shelley Self
(74) *Attorney, Agent, or Firm*—Troxell Law Office, PLLC

(57) ABSTRACT

A work feeding and conveying device for a planing machine includes a conveying unit assembled on an intermediate base of a planing machine. The conveying unit has a power source, a front shaft, a rear shaft and a conveying belt. The front shaft is secured at the front end of the intermediate base and connected with a power source for being rotated. The rear shaft is pivotally connected with the rear end of the intermediate base, able to be moved back and forth horizontally for a present distance. The conveying belt formed with a rough surface with high friction coefficient is fitted around the intermediate base and passes on the front and the rear shaft. The conveying belt can smoothly convey a work piece, and evenly apply force on its surface, able to carry out wood processing precisely.

4 Claims, 6 Drawing Sheets

WORK FEEDING AND CONVEYING DEVICE FOR A PLANING MACHINE

BACKGROUND OF THE INVENTION

1. Field of the Invention

This invention relates to a work feeding and conveying device for a planing machine, particularly to one provided on an intermediate base with a conveying unit able to convey a work with even force to enable the work piece to be processed smoothly and precisely.

2. Description of the Prior Art

A conventional planing machine 10, as shown in FIG. 1, includes a flattop planing table 11 assembled thereon with an intermediate base 12 and an upper base 13. The intermediate base 12 is a flat stand pivotally disposed with two rollers 121 at its upper end, and the upper base 13 is provided thereon with a rotary arm 131 able to be turned for adjusting the distance between the intermediate base 12 and the upper base 13. Further, the upper base 13 is pivotally installed inside with a planing knife 132 driven by a motor (not shown) to carry out planing work. The planing knife 132 has its front and rear side respectively and pivotally provided with a press-convey roller 133 driven to rotate by the motor. When the press-convey rollers 133 are rotated and shifted, a work will be pressed and drawn forward by the press-convey rollers 133 to be processed from the front end of the intermediate base 12 and after planed into a predetermined thickness, the work will be sent out from the rear end of the intermediate base 12.

However, the two press-convey rollers 133 of the conventional planing machine are respectively positioned at the front and the rear side of the planing knife 132; therefore, when a work piece is pressed and conveyed by the press-convey rollers 133, it will contact linearly with the press-convey rollers 133. In this condition, when pressed by a single press-convey roller 133, the whole work piece can not be pressed evenly because of insufficient support force of that single press-convey roller 133. Thus, in the course of planing, the front and the rear end of the work cannot be kept flat and straight, and in consequence the work fails to be planed smoothly and precisely. In addition, as shown in FIG. 2, in order to enable the motor to simultaneously drive both the planing knife 132 and the press-convey rollers 133, which are quite different in functions and rotating speeds, a speed-reducing unit 132 composed of plural gears has to be additionally provided between the planing knife 132 and the rollers 133 for mutual operation, but the speed-reducing unit 134 is complicated in structure and not easy in maintenance, thus increasing the size and cost of a planing machine.

SUMMARY OF THE INVENTION

The objective of this invention is to offer a work feeding and conveying device for a planing machine, which is provided with a conveying unit on the intermediate base of a planing machine. The conveying unit consists of a front shaft, a rear shaft and a conveying belt. The front shaft is secured at the front end of the intermediate base and has one end connected with a power source for driving the front shaft to rotate. The rear shaft is pivotally connected with the rear end of the intermediate base, able to be moved back and forth horizontally a predetermined distance. The conveying belt is fitted around the intermediate base and passes on both the front and the rear shaft, able to be actuated to rotate by the front shaft and its tightness able to be adjusted by the rear shaft. The conveying belt is formed with a rough surface with high friction coefficient; therefore, when the conveying belt conveys a work piece, it can evenly apply force on its surface of a work, thus preventing the work from becoming curved in the course of conveying and able to carry out wood processing smoothly and precisely.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
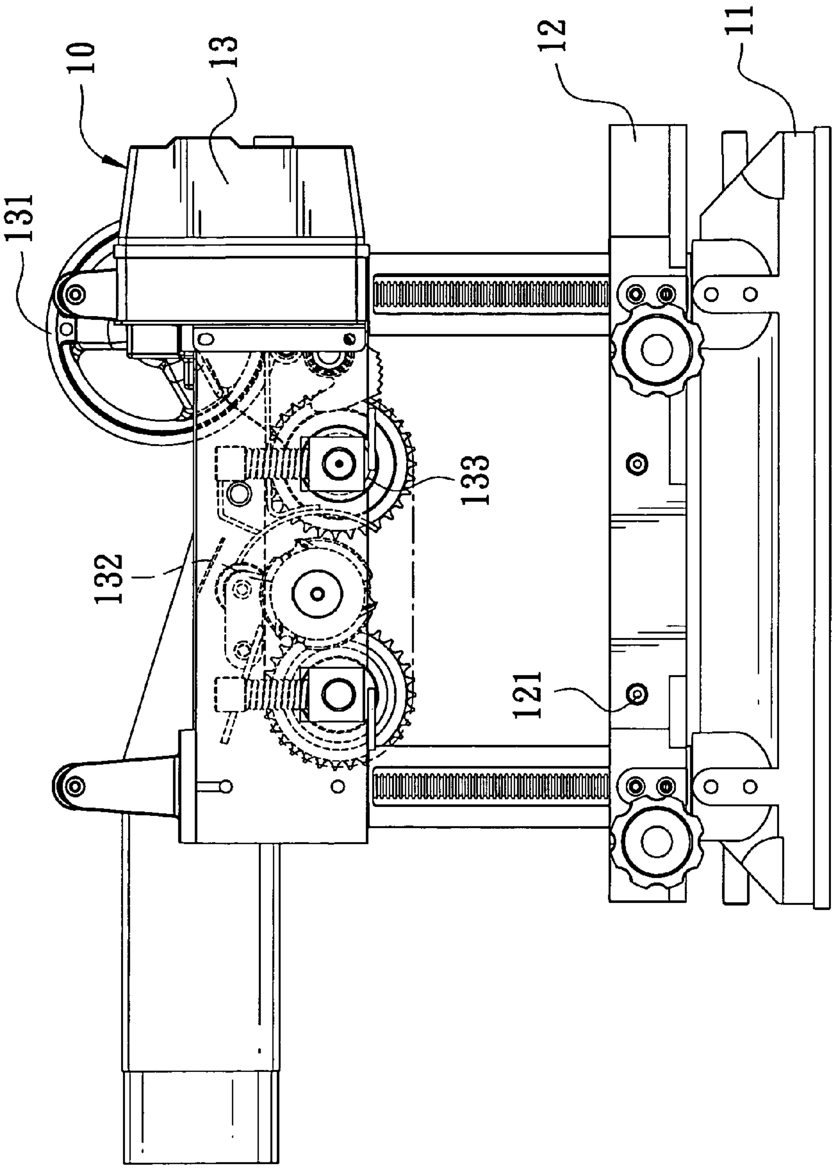
FIG. 1 PRIOR ART
FIG. 1 is a front cross-sectional view of a conventional planing machine.
Figure 2:
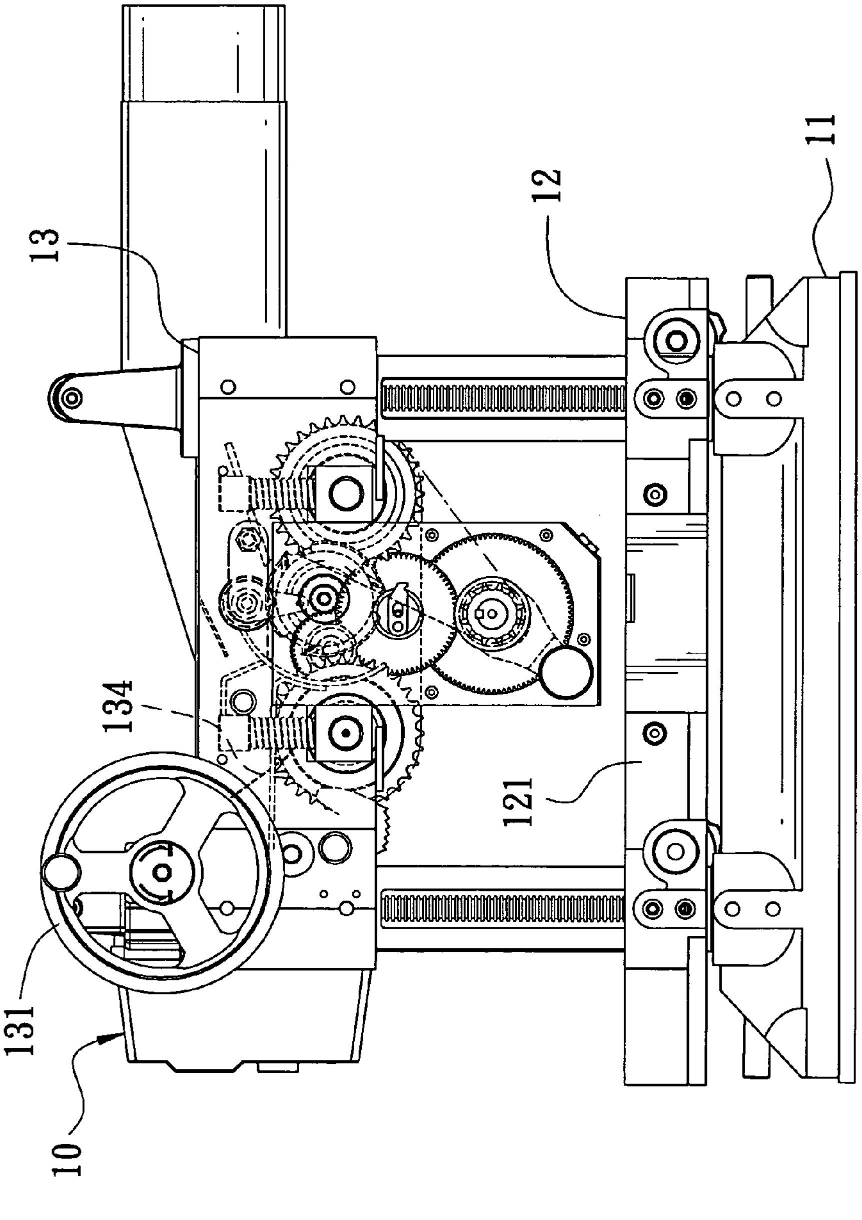
FIG. 2 PRIOR ART
FIG. 2 is a rear cross-sectional view of the conventional planing machine.
Figure 3:
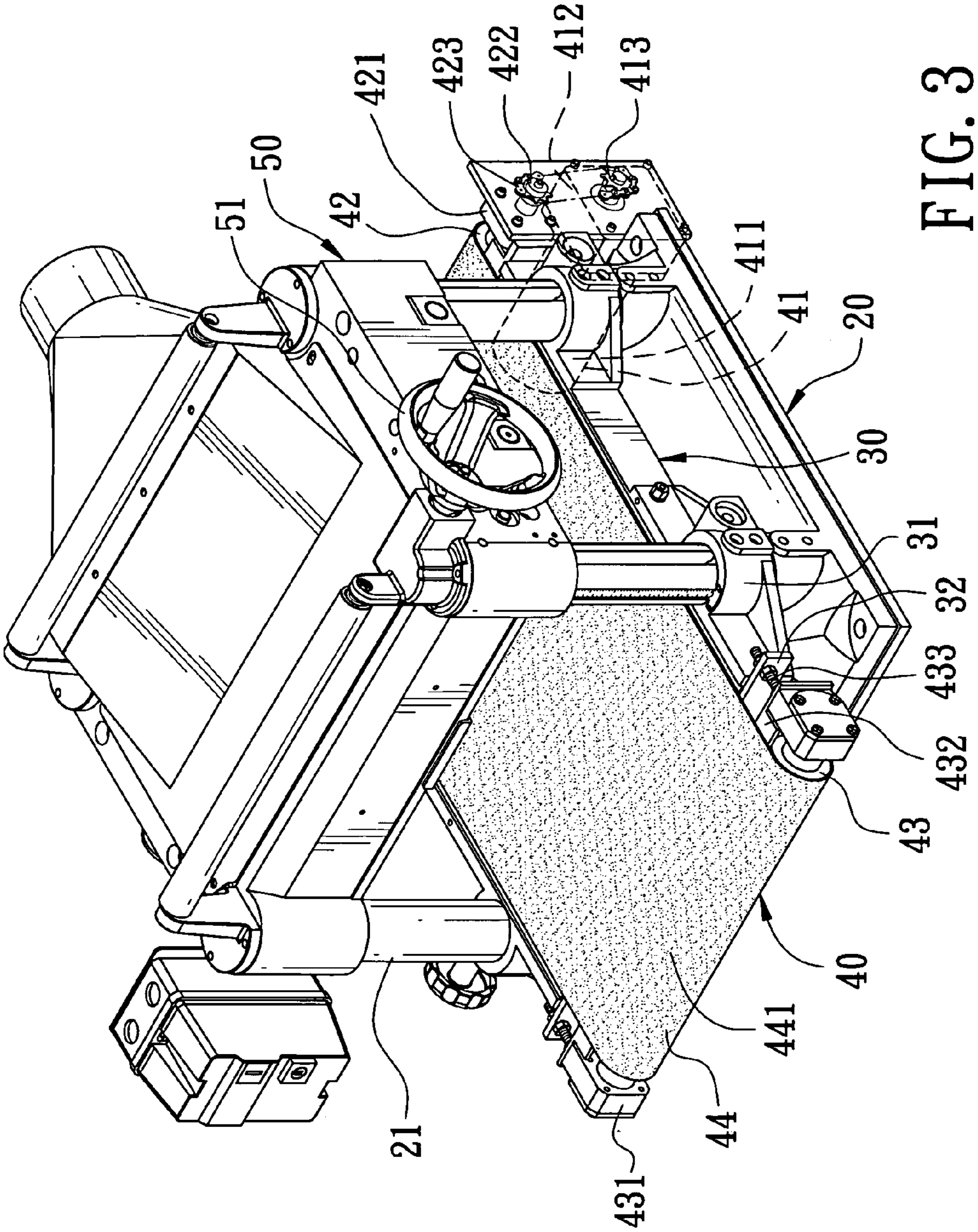
FIG. 3 is a perspective view of a first preferred embodiment of a work feeding and conveying device for a planing machine in the present invention.
Figure 4:
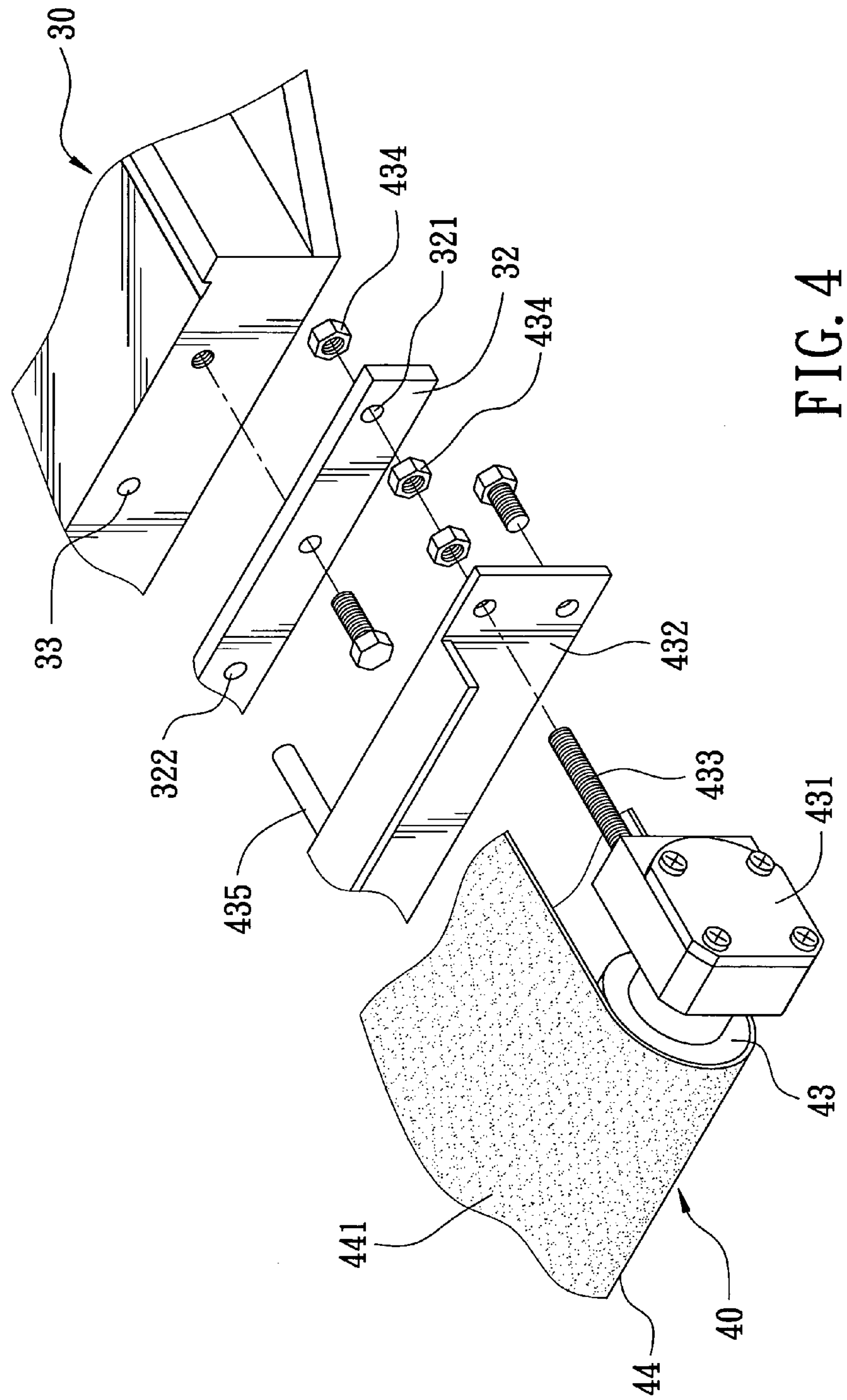
FIG. 4 is a partial exploded perspective view of the first preferred embodiment of a work feeding and conveying device for a planing machine in the present invention.
Figure 5:
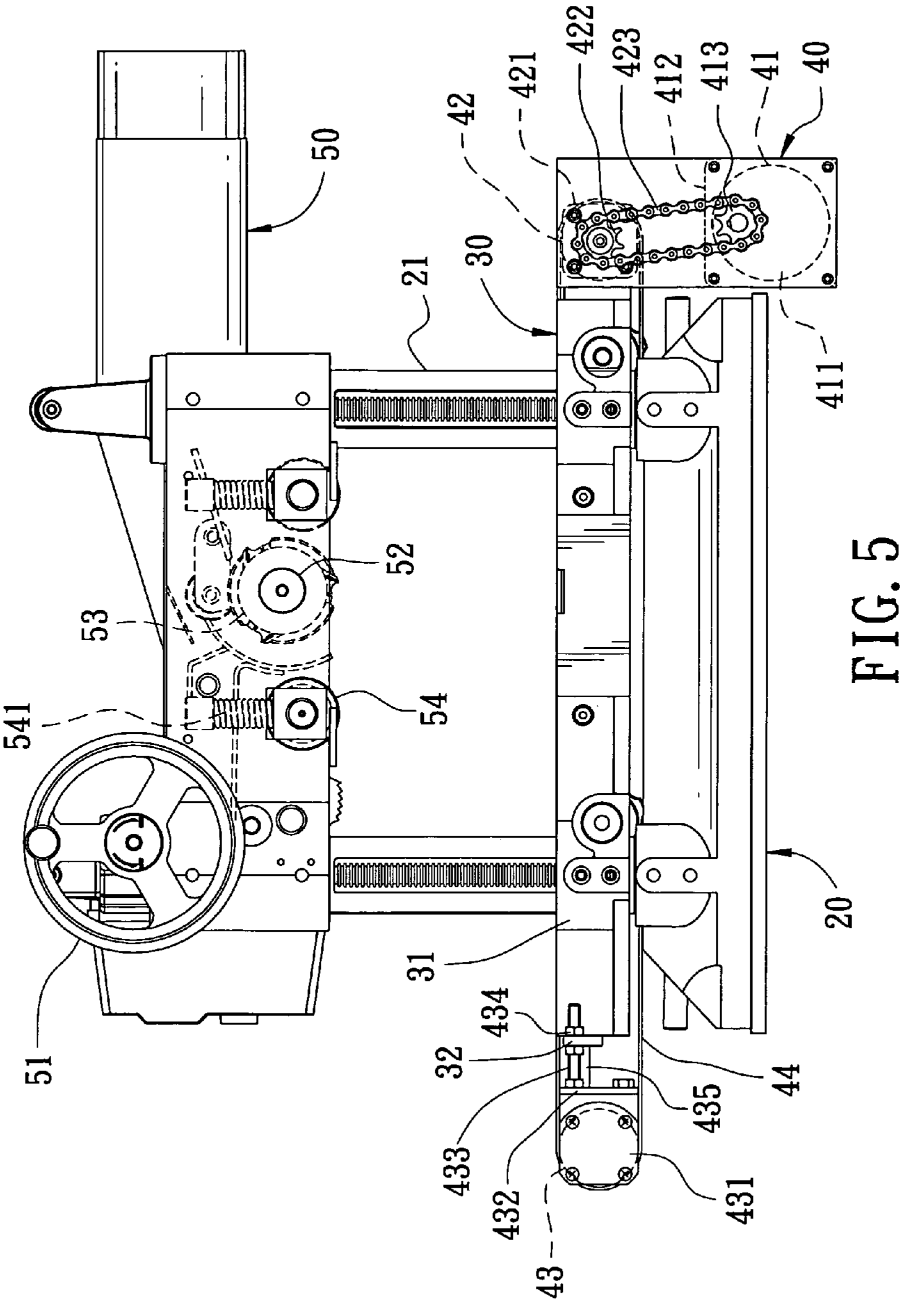
FIG. 5 is a side cross-sectional view of the first preferred embodiment of a work feeding and conveying device for a planing machine in the present invention.

A first preferred embodiment of a work feeding and conveying device for a planing machine in the present invention, as shown in FIGS. 3, 4 and 5, includes a planing table 20, an intermediate base 30, a conveying unit 40 and an upper base 50 combined together.

The planing table 20 with a flat top has four threaded rods 21 vertically fixed on its periphery and a motor (not shown) installed in the interior.

The intermediate base 30 has it periphery provided with four vertical projections respectively bored with a threaded hole 31 to be respectively screwed on the four threaded rods 21 of the planing table 20. The intermediate base 30 further has its rear end provided with a protruding block 32 having its opposite ends respectively bored with a through hole 321 and its central portion bored with two slide holes 322. Furthermore, the intermediate base 30 has two insert holes 33 bored in the central portion of its rear wall and aligned to the two slide holes 322 of the protruding block 32.

The conveying unit 40 is assembled on the intermediate base 30 and composed of a power source 41, a front shaft 42, a rear shaft 43 and a conveying belt 44. The power source 41 is secured at one side of the intermediate base 30 and composed of a motor 411 and a preset speed-change gear unit 412 connected with the spindle of the motor 411 and having its outside provided with a driving gear 413. The front shaft 42 is secured at the front end of the intermediate base 30 by means of two bearing supports 421, having one end disposed with a sprocket 422 protruding outward, with an endless chain 423 circulating around the sprocket 422 and the driving gear 413 of the power source 41. The rear shaft 43 is pivotally positioned at the rear end of the intermediate base 30 by two bearing supports 431 having their front ends secured with a connecting plate 432, which has its opposite ends respectively fixed with an adjusting rod 433 to be inserted through the through hole 321 of the protruding block 32 of the intermediate base 30, with two nuts 434 screwed on each adjusting rod 433 and respectively positioned at the opposite sides of the through hole 321. In addition, the connecting plate 432 has its lower side disposed with two slide rails 435 to be respectively inserted through the two slide holes 322 of the protruding block 32 and positioned in the two insert holes 33 of the intermediate base 30, letting the connecting plate 432 restrictively positioned in the insert holes 33. The conveying belt 44 having a rough surface 441 with high friction coefficient is fitted around the intermediate base 30 and passes on both the front and the rear shaft 42, 43 of the conveying-unit 40 to be actuated to rotate by the front shaft 42.

The upper base 50 is secured on the upper ends of the four threaded rods 21 and has a rotary handle 51 threadably fixed at a predetermined location to be turned for actuating the threaded rods 21 to rotate and move upward the threaded holes of the intermediate base 30 for adjusting the distance between the upper base 50 and the intermediate base 30. Further, the upper base 50 is provided at a predetermined location with a knife shaft 52 pivotally connected with a planing knife 53. The knife shaft 52 has its end extending out of the upper base 50 and connected with the motor of the planing table 20, letting the planing knife 53 driven by the motor to rotate and carry out planing work. Furthermore, two rollers 54 are respectively and pivotally disposed at the front and the rear side of the planing knife 53 and respectively installed at the upper side with an elastic member 541 for elastically pressing the roller 54 downward.

To carry out planing work, as shown in FIGS. 4 and 5, firstly, the rotary handle 51 is turned around to adjust the distance between the intermediate base 30 and the upper base 50, with the upper base 50 moved up and down. Next, a work is pushed in from the front end of the intermediate base 30, and the front shaft 42 is driven to rotate and actuate the conveying belt 44 to circulate and convey the work from the front end to the rear end of the intermediate base 30. At this time, the rollers 54 of the upper base 50 will be actuated by the moving work to rotate and press the work on the conveying belt 44 by the elasticity of the elastic members 541 to enable the work piece to be planed smoothly and precisely. Additionally, the distance between the rear shaft 43 of the conveying unit 40 and the intermediate base 30 as well as the tightness of the conveying belt 44 can be adjusted by the adjusting rods 433 on the connecting plate 432.

Figure 6:
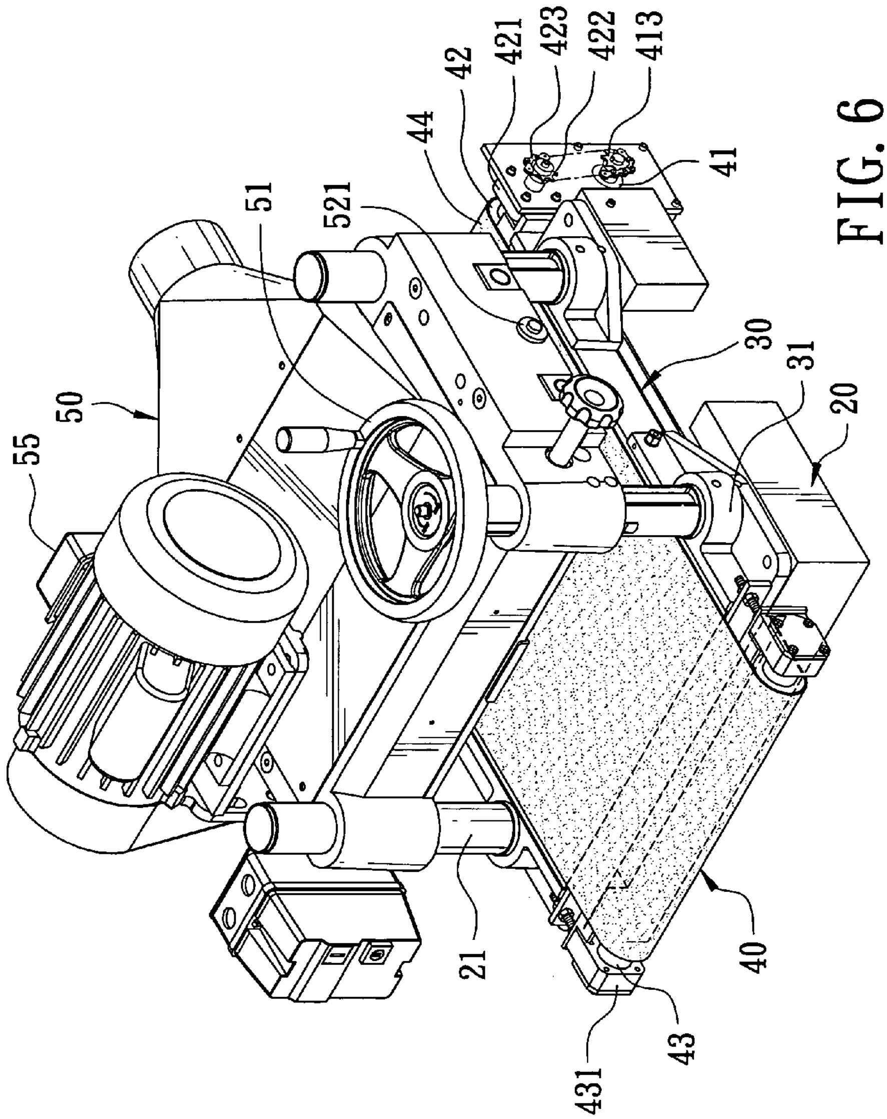
FIG. 6 is a perspective view of a second preferred embodiment of a work feeding and conveying device for a planing machine in the present invention.

A second preferred embodiment of a work piece feeding and conveying device for a planing machine in the present invention, as shown in FIG. 6, has the same function as that described in the first preferred embodiment. In the second preferred embodiment, the intermediate base 30 is secured on the planing table 20 and the rotary handle 51 is turned to control the position of the upper base 50 on the threaded rods 21 and ad just the processing distance between the upper base 50 and the intermediate base 30. A motor 55 for driving the knife shaft 52 to rotate is fixed at the topside of the upper base 50, and the knife shaft 52 is provided with an interactive rod 521 extending out of one side of the upper base 50 to be connected with other transmission mechanism, driven by the knife shaft 52 to rotate and transmit power to the front shaft 42 of the conveying unit 40.

To sum up, this invention has the following advantages.

1. The conveying belt of the conveying unit of this invention conveys a wooden work by contacting on its surface, able to apply force with balance and carry out wood processing with precision.

2. The rollers of this invention are actuated to rotate by the moving work, so an extra power source or gear unit for driving the rollers is not necessary, lessening cost as well as frequency of maintenance of a planing machine and elevating market competition power.

While the preferred embodiments of the invention have been described above, it will be recognized and understood that various modifications may be made therein and the appended claims are intended to cover all such modifications that may fall within the spirit and scope of the invention.

I claim:

1. A work feeding and conveying device for a planing machine comprising a planing table, an intermediate base, a conveying unit and an upper base, a distance between said intermediate base and said upper base is adjustable;

said planing table formed with a flat upper surface, said planing table assembled thereon with said intermediate base and said upper base;

said intermediate base positioned on said planing table, said conveying unit mounted on said intermediate base and composed of a front shaft, a rear shaft and a conveying belt, said front shaft secured at the front end of said intermediate base and having one end connected with a power source, said rear shaft pivotally assembled at the rear end of said intermediate base and able to be moved back and forth horizontally for a predetermined distance, said conveying belt having a rough surface with high friction coefficient, said conveying belt fitted around said intermediate base and passing on both said front shaft and said rear shaft, the tightness of said conveying belt able to be adjusted by said rear shaft, said conveying belt actuated to circulate around said front shaft and said rear shaft by said front shaft; and said upper base positioned above said intermediate base, said upper base provided at a predetermined location with a knife shaft pivotally connected with a planing knife, said planing knife rotated together with said knife shaft for carrying out wood work processing, said planing knife having its front and rear side respectively and pivotally provided with a roller, wherein said intermediate base has its rear side fixed with a protruding block having the opposite ends respectively extending out of said intermediate base and bored with a through hole, said protruding block bored with two slide holes in the center, said intermediate base having its rear side wall bored with two insert holes respectively aligned to said two slide holes of said protruding block, said rear shaft having its opposite ends respectively and pivotally connected with a bearing support, a connecting plate secured at the front ends of said two bearing supports of said rear shaft, said connecting plate having its opposite ends respectively fixed with an adjusting rod to be inserted through said through hole of said protruding block, said connecting plate having its front lower side fixed with two slide rails extending forward vertically to be respectively inserted in said two insert holes of said intermediate base.

2. The work piece feeding and conveying device for a planing machine as claimed in claim 1, wherein said front shaft is secured on said intermediate base by two bearing supports and has one end extending outward and disposed with a sprocket, a power source composed of a motor and a speed-change gear unit, said power source having its front end provided with a driving gear driven by a chain extending around said sprocket and said driving gear.

3. The work piece feeding and conveying device for a planing machine as claimed in claim 1, wherein said knife shaft is provided with an interactive rod extending out of one side of said upper base.

4. The work piece feeding and conveying device for a planing machine as claimed in claim 1, wherein said two rollers have their upper sides respectively provided with an elastic member.

* * * * *